(12) United States Patent
Nguyen et al.

(10) Patent No.: US 10,106,731 B2
(45) Date of Patent: Oct. 23, 2018

(54) METHODS AND COMPOSITIONS FOR PROVIDING PROPPANT SUSPENSION AND CONSOLIDATION IN SUBTERRANEAN TREATMENT OPERATIONS

(71) Applicant: Halliburton Energy Services, Inc., Houston, TX (US)

(72) Inventors: Philip D. Nguyen, Houston, TX (US); Loan K. Vo, Houston, TX (US); Prashant D. Chopade, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 198 days.

(21) Appl. No.: 15/114,768

(22) PCT Filed: Jun. 19, 2014

(86) PCT No.: PCT/US2014/043127
§ 371 (c)(1),
(2) Date: Jul. 27, 2016

(87) PCT Pub. No.: WO2015/195126
PCT Pub. Date: Dec. 23, 2015

(65) Prior Publication Data
US 2016/0340575 A1 Nov. 24, 2016

(51) Int. Cl.
| | | |
|---|---|---|
| *C09K 8/80* | (2006.01) | |
| *C09K 8/68* | (2006.01) | |
| *C09K 8/70* | (2006.01) | |
| *C09K 8/88* | (2006.01) | |
| *E21B 43/26* | (2006.01) | |
| *E21B 43/267* | (2006.01) | |

(52) U.S. Cl.
CPC .............. *C09K 8/805* (2013.01); *C09K 8/685* (2013.01); *C09K 8/706* (2013.01); *C09K 8/887* (2013.01); *E21B 43/26* (2013.01); *E21B 43/267* (2013.01); *C09K 2208/24* (2013.01); *C09K 2208/26* (2013.01)

(58) Field of Classification Search
CPC ....................................................... E21B 43/02
See application file for complete search history.

(56) References Cited

U.S. PATENT DOCUMENTS

| | | |
|---|---|---|
| 5,853,048 A | 12/1998 | Weaver et al. |
| 6,047,772 A | 4/2000 | Weaver et al. |
| 6,892,813 B2 | 5/2005 | Nguyen et al. |
| 7,021,379 B2 | 4/2006 | Nguyen |
| 7,216,711 B2 | 5/2007 | Nguyen et al. |
| 8,689,872 B2 | 4/2014 | Welton et al. |
| 2004/0094297 A1 | 5/2004 | Malone et al. |

(Continued)

OTHER PUBLICATIONS

International Search Report and Written Opinion for PCT/IS2014/043127 dated Mar. 20, 2015.

*Primary Examiner* — William D Hutton, Jr.
*Assistant Examiner* — Avi T Skaist
(74) *Attorney, Agent, or Firm* — McGuireWoods LLP

(57) ABSTRACT

Coated proppant particulates for use in subterranean formation operations comprising: proppant particulates at least partially coated with a dual tackifying-hardening agent selected from the group consisting of a dimer acid/trimer acid blend, with a crosslinking agent at least partially coated thereon, wherein the dual tackifying-hardening agent both exhibits tackifying qualities and is capable of hardening a curable resin.

20 Claims, 1 Drawing Sheet

(56) References Cited

U.S. PATENT DOCUMENTS

| | | |
|---|---|---|
| 2004/0211561 A1 | 10/2004 | Nguyen et al. |
| 2005/0194137 A1 | 9/2005 | Nguyen et al. |
| 2007/0114022 A1 | 5/2007 | Nguyen |
| 2013/0233545 A1 | 9/2013 | Mahoney et al. |
| 2014/0000891 A1 | 1/2014 | Mahoney et al. |
| 2014/0311743 A1 | 10/2014 | Vo et al. |
| 2014/0311745 A1 | 10/2014 | Vo et al. |

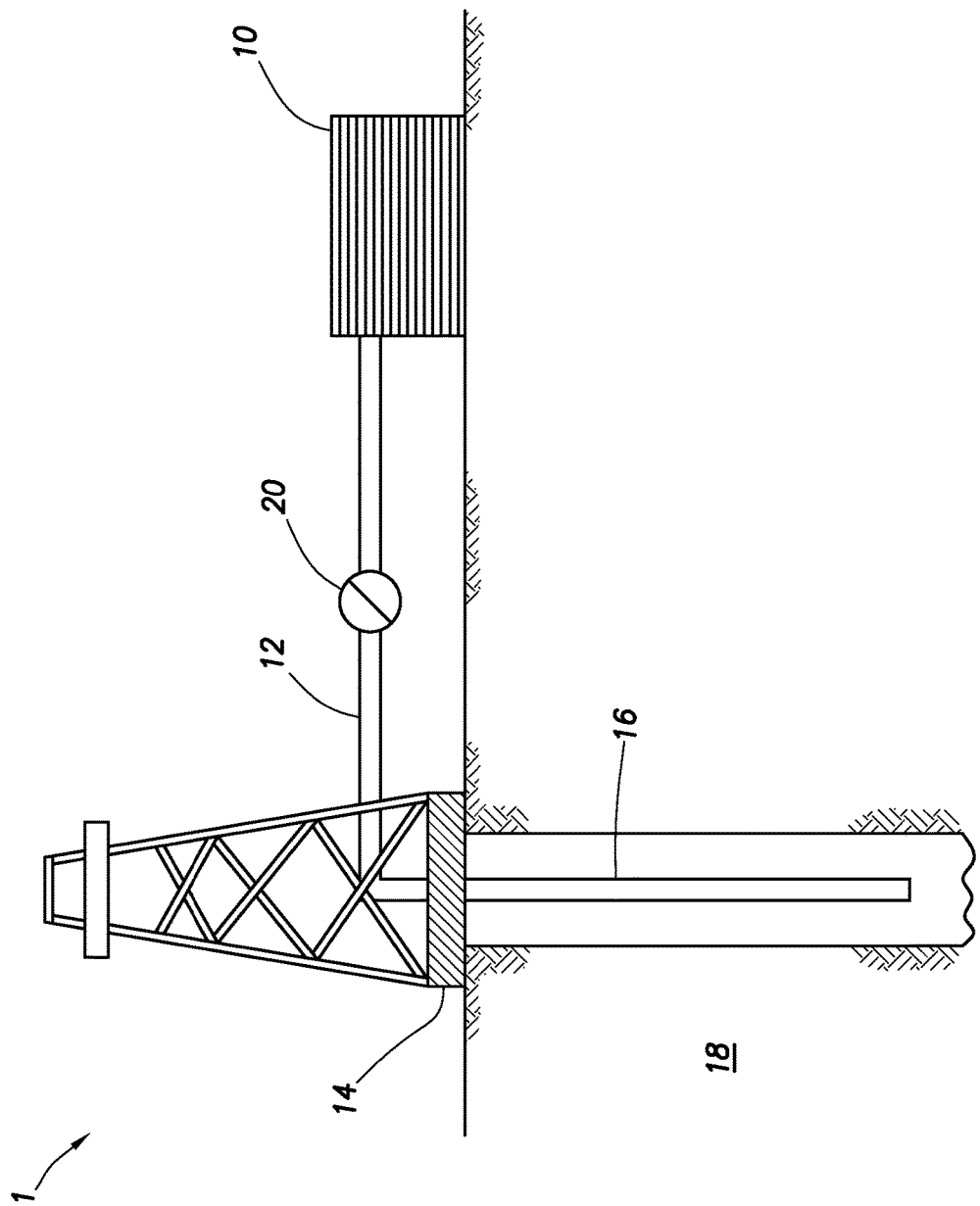

METHODS AND COMPOSITIONS FOR PROVIDING PROPPANT SUSPENSION AND CONSOLIDATION IN SUBTERRANEAN TREATMENT OPERATIONS

BACKGROUND

The embodiments herein relate to methods and compositions for proppant suspension and consolidation in subterranean treatment operations.

Subterranean wells (e.g., hydrocarbon producing wells) are often stimulated by hydraulic fracturing treatments. In hydraulic fracturing treatments, a treatment fluid is pumped into a portion of a subterranean formation at a rate and pressure such that the subterranean formation breaks down and one or more fractures are formed. Typically, particulate solids, such as graded sand, are suspended in a portion of the treatment fluid and then deposited into the fractures. These particulate solids, or "proppant particulates," serve to prop the fracture open (e.g., keep the fracture from fully closing) after the hydraulic pressure is removed. By keeping the fracture from fully closing, the proppant particulates aid in forming conductive paths through which produced fluids, such as hydrocarbons, may flow.

The degree of success of a fracturing operation depends, at least in part, upon fracture porosity and conductivity once the fracturing operation is complete and production has begun. Thus, the proppant particulates should be substantially evenly distributed throughout the treatment fluid such that a sufficient number of the proppant particulates are placed within a fracture to prop the fracture open. For this reason, viscosified treatment fluids are typically used to place proppant particulates into a fracture in a subterranean formation because the viscous nature of the treatment fluid is capable of maintaining the proppant particulates in suspension, thereby reducing their tendency to settle out of the treatment fluid prior to reaching the fracture or other desired placement zone.

Once placed inside a fracture, the distribution of the proppant particulates creates a permeable medium, or a "proppant pack," through which production fluids flow from the formation and into the wellbore for collection at the surface. As the production fluids flow through the interstitial spaces between adjacent proppant particulates in the proppant pack, insufficiently bound or loose proppant particulates will be entrained with the production fluid and produced into the wellbore, termed "proppant flowback." Proppant flowback may be particularly detrimental to subterranean formation operations and equipment, as the proppant particulates flow into the wellbore and to the surface eroding metal goods, plugs, piping, valves, instruments, and other production equipment. Moreover, additional time and equipment expense is necessary to remove the proppant particulates from desired production fluids.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering the treatment fluids of the embodiments described herein to a downhole location.

DETAILED DESCRIPTION

The embodiments herein relate to methods and compositions for proppant suspension and consolidation in subterranean treatment operations.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

In some embodiments, coated proppant particulate compositions for use in subterranean formation operations are provided. The coated proppant particulates may be used in a variety of subterranean formation operations and, in particular, stimulation or fracturing operations where a proppant pack is formed to prop open a fracture through which produced fluids flow. The coated proppant particulates described herein comprise proppant particulates that are at least partially (or wholly) coated with a dual tackifying-hardening agent ("DTHA"). As used herein, the term "dual tackifying-hardening agent" refers to a composition capable of both exhibiting a tacky quality and reacting to harden and cure a curable resin. As used herein, the term "tacky" refers to a quality of a substance such that it is somewhat sticky to the touch. The DTHAs for use in the present invention include, but are not limited to, a dimer acid/trimer acid blend.

In general, the exemplary dual tackifying and hardening agent qualities of the DTHA may be achieved where the dimer acid is present in an amount in the range of an upper limit of about 98%, 97%, 96%, 95%, 94%, 93%, 92%, 91%, 90%, 89%, and 88% to a lower limit of about 78%, 79%, 80%, 81%, 82%, 83%, 84%, 85%, 86%, 87%, and 88% by weight of the DTHA, encompassing any value and subset therebetween. The trimer acid may be present in the DTHA in an amount in the range of from an upper limit of about 22%, 21%, 20%, 19%, 18%, 17%, 16%, 15%, 14%, 13%, 12%, and 11% to a lower limit of about 2%, 3%, 4%, 5%, 6%, 7%, 8%, 9%, 10%, and 11% by weight of the DTHA, encompassing any value and subset therebetween. In some embodiments, the DTHA may further comprise a fatty acid including, but not limited to, oleic acid. The fatty acid may be present in an amount in the range of from an lower limit of about 0.1%, 0.2%, 0.3%, 0.4%, 0.5%, 0.6%, 0.7%, 0.8%, 0.9%, and 1% to an upper limit of about 2%, 1.9%, 1.8%, 1.7%, 1.6%, 1.5%, 1.%, 1.3%, 1.2%, 1.1%, and 1% by weight of the DTHA, encompassing any value and subset therebetween. Typically, the fatty acid serves as the precursor to the dimer acid and/or trimer acid.

A crosslinking agent is at least partially coated onto the proppant particulates. In some embodiments, due to the tacky quality of the DTHA, the crosslinking agent is at least partially (or wholly) adhered to the DTHA coated onto the proppant particulates. The crosslinking agent is coated onto the proppant particulates or adhered to the DTHA such that it is still reactive with a gelling agent; that is, the crosslinking agent is not itself embedded or otherwise inactivated by such coating or adherence. The crosslinking agent may be any crosslinking agent capable of reacting with one or more molecules of a gelling agent to form a crosslinked gelling agent capable of viscosifying a fluid, such as an aqueous base fluid. The crosslinking agent may be in either liquid or dry form, and such form may depend, inter alia, on the type of DTHA selected, the storage requirements of the coated proppant particulates, the destined use of the coated proppant particulates, and the like. Generally, the crosslinking agent used to form the coated proppant particulates described herein includes a metal ion, a compound capable of producing a metal ion, a multifunctional boronic acid compound, and any combination thereof.

Examples of suitable metal ion crosslinking agents may include, but are not limited to, borate ions, magnesium ions, zirconium IV ions, titanium IV ions, aluminum ions, antimony ions, chromium ions, iron ions, copper ions, magnesium ions, zinc ions, and any combination thereof. Examples of suitable compounds capable of producing a metal ion for use as the crosslinking agent(s) herein may include, but are not limited to, ferric chloride, boric acid, disodium octaborate tetrahydrate, sodium diborate, pentaborates, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, aluminum citrate, antimony compounds, chromium compounds, iron compounds, copper compounds, zinc compounds, and any combinations thereof.

In some embodiments, the multifunctional boronic acid crosslinking agents may comprise a polymeric backbone with a boronic acid functional group attached at one or more points along the polymer chain. In some embodiments, the multifunctional boronic acid crosslinking agents may comprise a copolymer that comprises at least one boronic acid monomer unit and at least one water-soluble monomer unit. In some embodiments, the multifunctional boronic acid crosslinking agents may comprise a random copolymer of at least one boronic acid monomer unit and at least one water-soluble monomer unit, particularly a random copolymer in which the boronic acid monomer units are distributed over substantially all of the polymer chain length. In alternative embodiments, the multifunctional boronic acid crosslinking agents may comprise a copolymer that is a gradient copolymer. In other embodiments, the multifunctional boronic acid crosslinking agents can comprise a copolymer that is not a gradient copolymer. In some embodiments, the multifunctional boronic acid crosslinking agents may comprise a copolymer that has less gradient copolymer character than a similar copolymer produced by conventional synthetic techniques.

In general, any boronic acid or boronate ester derived therefrom may be suitable for use in the multifunctional boronic acid crosslinking agents of the present disclosure. That is, the multifunctional boronic acid crosslinking agents may contain a boronic acid group (e.g., —B(OH)$_2$) or a boronate ester derived therefrom. In some embodiments, the boronic acids may be aryl boronic acids, particularly vinyl aryl boronic acids. A suitable aryl boronic acid may include, but is not limited to, 4-vinylphenylboronic acid or its positional isomers. Other substitutable aryl boronic acids may contain a polymerizable functional group (e.g., alkene) and optional functionality on the aryl ring (e.g., alkyl groups, halogens, carbonyl groups, amines, hydroxyl groups, carboxylic acids and their derivatives, and the like). In other embodiments, the boronic acids containing a polymerizable functional group may be alkyl, alkenyl, or alkynyl boronic acids (i.e., aliphatic boronic acids) in which the alkyl, alkenyl, or alkynyl groups can contain optional substitution, if desired.

In some embodiments, the multifunctional boronic acid crosslinking agent may be a block copolymer including, but not limited to, a diblock, triblock or multiblock copolymer. The multifunctional boronic acid crosslinking agent may also be a copolymer of various monomers and can also be in the form of comb, brush, or dentritic shaped polymer. In some embodiments, the multifunctional boronic acid crosslinking agents of the present disclosure may be water-soluble.

An exemplary structure of a dendrimeric multifunctional boronic acid crosslinking agent is shown in Formula I, where R is an organic group.

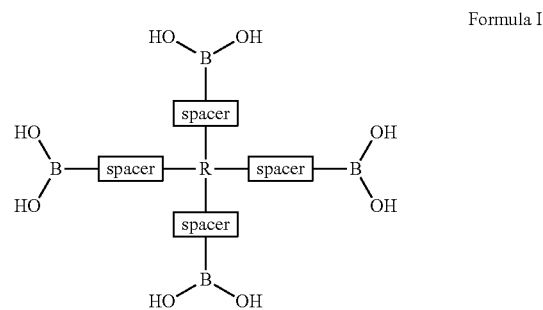

Formula I

As used herein, the terms "dendritic polymers" or "dendrimers" refer to polymers which are distinguished by a branched structure. Dendrimers (e.g., cascade polymers, arborols, isotropically branched polymers, isobranched polymers, and/or starburst polymers) generally are macromolecules which are uniform at the molecular level and have a highly symmetrical structure. Dendrimers are derived structurally from star polymers, the individual chains in turn each being branched in a star-like manner. They can form from small molecules by a constantly repeating reaction sequence, resulting in one or more branches, on the ends of which there are functional groups which in turn are starting points for further branching. Thus, the number of functional terminal groups multiplies with each reaction step. A characteristic feature of the dendrimers is the number of reaction steps (generations) carried out for their synthesis. Owing to their uniform structure, dendrimers can have as a rule a defined molar mass. In some embodiments, the multifunctional boronic acid crosslinking agents of the present disclosure may be dendrimeric in nature with about 2 to about 10 generations, or about 2 to about 5 generations. In some embodiments, the dendrimeric multifunctional boronic acid crosslinking agents can generally have a molecular weight between about 1,000 Daltons and 10,000 Daltons.

As used herein, the term "star polymer" refers to polymers in which three or more chains extend from a center moiety. The center moiety can be a single atom or a group of atoms. Star polymers can be produced either by polymerization from multifunctional cores or by post modification reactions. Polymerization from a multifunctional core can be desirable for high molecular weight polymers.

The dendritic or star multifunctional boronic acid crosslinking agents may comprise any suitable monomer units and/or spacer units (e.g., "R" or "spacer" in Formula I) that result in a suitable crosslinking agent. In some embodiments, the monomer units can be water-soluble. For example, Formula I illustrates a dendritic multifunctional boronic acid crosslinking agent with at least one generation that may have up to four boronic acid functional groups. In some embodiments with at least 2 generations, the dendritic multifunctional boronic acid crosslinking agents can have up to eight boronic acid functional groups in the outer generation. In addition to the boronic acid functional group, spacer units can comprise a polymer or oligomer synthesized from at least one water-soluble monomer unit that may include, but is not limited to, acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, vinylbenzene sulfonic acid, methacrylic acid, vinyl caprolactam, N-vinylformamide, diallyl amine, N,N-diallylacetamide, dimethyldiallyl ammonium halide, itaconic acid, styrene sulfonic acid, methacrylamidoethyltrimethyl ammonium halide, a quaternary salt derivative of acrylamide, a quaternary salt derivative of acrylic acid, alkyl acrylate, alkyl methacrylate, alkyl acrylamide, alkyl methacrylamide, alkyl dimethylammoniumethyl methacrylate halide, alkyl dimethylammoniumpropyl methacrylamide halide, any derivative thereof, and any combination thereof.

Suitable spacer units may also comprise any suitable linkage moieties, including, but not limited to, an amide, ester, ether, phosphate esters, amide, acetal, ketal, orthoester, carbonate, anhydride, silyl ether, alkene oxides, ether, imine, ether ester, ester amide, ester urethane, carbonate urethane, amino acids linkage, and any combination thereof. Suitable spacer units may also comprise any suitable linkage moieties, including but not limited, to an alkane, a polyethylene amine, a polyethylene oxide, a polyester, polycarbonate, polyurethane, polyphosphate esters, polyamides, polyacetals, polyketals, polyorthoesters, polyanhydrides, polysilyl ethers, polyalkene oxides), polyethers, polyimines, poly (ether esters), poly(ester amides), poly(ester urethanes), poly(carbonate urethanes), and poly(amino acids), and any combination thereof.

In addition to water-soluble monomer units and/or spacer units, one or more hydrophobic and/or hydrophilic monomer units or polymers comprising hydrophobic monomers may also be present in the interior generations of the dendrimer so long as any hydrophobic monomer units do not interfere with the function of the crosslinking agent in the treatment fluids described herein. In some embodiments, the multifunctional boronic acid crosslinking agents can have a ratio of boronic acid functional groups to monomers on the outer generation ranging from a lower limit of about 1:1, 1:10, 1:20, 1:30, 1:40, 1:50, 1:60, 1:70, 1:80, 1:90, and 1:100 to an upper limit of about 1:200, 1:190, 1:180, 1:170, 1:160, 1:150, 1:140, 1:130, 1:120, 1:110, and 1:100, encompassing any value and any subset therebetween.

In some embodiments, the multifunctional boronic acid crosslinking agents may be a difunctionalized molecule. A suitable difunctionalized molecule structure may include, but is not limited to, the structure generally represented by Formula II, where $R_1$ is an organic group.

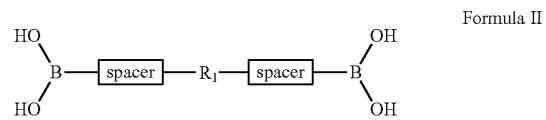

Formula II

In Formula II, $R_1$ and/or the spacer(s), alone or in combination, may be a functional group, a monomer, and/or a polymer with an average molecular weight in the range of about 200 Daltons to about 2,000,000 Daltons. The spacer(s) may be a small oligomer, a functional group, or a polymer suitable for connecting the monomer or polymer R1 to the boronic acid functional group. Suitable spacer units may comprise any suitable moieties, including, but not limited to, an amide group, an ester group, or an ether group. Suitable polymers useful as spacer units may include, but are not limited to, polyalphaolefins, polyaryletherketones, polybutenes, polyimines, polycarbonates, polyesters, aromatic polyamides, ethylene vinyl acetate polymers, polyacetals, polyethylenes, polyethylene oxides, polypropylenes, polymethylpentene, polyphenylene oxide, polystyrene, any derivative thereof, and any combination thereof. In some embodiments, the multifunctional boronic acid crosslinking agents of the general structure shown in Formula II may be a water-soluble polymer and may comprise any number of suitable monomer units.

The multifunctional boronic acid crosslinking agents may also be a copolymer. Suitable copolymer structures may include, but are not limited to, the structure generally represented by Formula III, where X represents a functionality bound to a monomer unit of the polymer backbone. Although Formula III has indicated a regular spacing between boronic acid monomer units, it is to be recognized that the spacing of boronic acid monomer units can be regular in some embodiments or random in other embodiments.

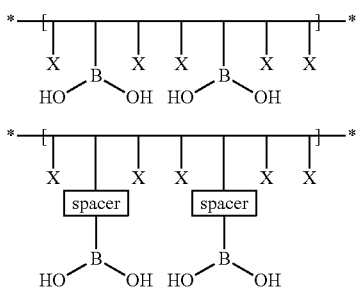

Formula III

In some embodiments, the multifunctional boronic acid crosslinking agent may comprise a copolymer that comprises at least one boronic acid monomer unit and at least one water-soluble monomer unit. In some embodiments, the multifunctional boronic acid crosslinking agent may comprise a random copolymer of at least one boronic acid monomer unit and at least one water-soluble monomer unit. In some embodiments, the multifunctional boronic acid crosslinking agent may comprise a copolymer that is a gradient copolymer. Formula IV shows a structure of an illustrative but non-limiting gradient copolymer containing monomer units A and B.

-BBBBBBBBBBBBB-
BAABAAAABAABAAAABBBBBBBBBBBBBBB- Formula IV

In some embodiments, the multifunctional boronic acid crosslinking agent may comprise a copolymer that is not a gradient copolymer. An illustrative, but non-limiting, non-gradient copolymer may have a structure shown in Formula V below, where A presents a monomer unit comprising a boronic acid functionality.

-ABBBBAABBBBBBABBBABAABABBBBAB-
BABBABBBABBBABB- Formula V

In some embodiments, the multifunctional boronic acid crosslinking agent may comprise a copolymer that has a reduced gradient copolymer character. For example, a multifunctional boronic acid crosslinking agent having a reduced gradient copolymer character might have only about 5 B monomer units on its chain termini, as compared to 15 B monomer units in Formula IV.

In some embodiments, a copolymer comprising the multifunctional boronic acid crosslinking agent may comprise at least one water-soluble monomer unit. Suitable water-soluble monomer units may include, but are not limited to, an acrylamide, a 2-acrylamido-2-methyl propane sulfonic acid, a N,N-dimethylacrylamide, a vinyl pyrrolidone, a dimethylaminoethyl methacrylate, an acrylic acid, a dimethylaminopropylmethacrylamide, a vinyl amine, a vinyl acetate, a trimethylammoniumethyl methacrylate chloride, a methacrylamide, a hydroxyethyl acrylate, a vinyl sulfonic acid, a vinyl phosphonic acid, a vinylbenzene sulfonic acid, a methacrylic acid, a vinyl caprolactam, a N-vinylformamide, a diallyl amine, a N,N-diallylacetamide, a dimethyldiallyl ammonium halide, an itaconic acid, a styrene sulfonic acid, a methacrylamidoethyltrimethyl ammonium halide, a quaternary salt derivative of acrylamide, a quaternary salt derivative of acrylic acid, an alkyl acrylate, an alkyl methacrylate, an alkyl acrylamide, an alkyl methacrylamide, an alkyl dimethylammoniumethyl methacrylate halide, an alkyl dimethylammoniumpropyl methacrylamide halide, any derivative thereof, and any combination thereof.

In various embodiments, a copolymer comprising the multifunctional boronic acid crosslinking agent may comprise at least one boronic acid monomer unit, particularly a boronic acid monomer unit containing a polymerizable vinyl, allyl, or acrylic functional group, or combinations thereof. In some embodiments, the at least one boronic acid monomer unit may comprise an aryl boronic acid. In other embodiments, the at least one boronic acid monomer unit may comprise an alkyl, alkenyl or alkynyl boronic acid (i.e., aliphatic boronic acids), or combinations thereof. It should be noted that the classification of a boronic acid as aryl, alkyl, alkenyl, or alkynyl refers to the point of attachment of the boronic acid group. That is, for example, an aryl boronic acid has a boronic acid or a boronate ester derivative thereof attached to an aryl ring, and an alkenyl boronic acid has a boronic acid or boronate ester derivative thereof attached to an alkenyl group. As previously noted, a boronic acid may have additional functionality elsewhere in the molecule. For example, an aryl boronic acid may have an alkenyl functionality elsewhere in the molecule that is not attached to the boronic acid functionality.

In some embodiments, the multifunctional boronic acid crosslinking agent may be a block copolymer including, but not limited to, a diblock, triblock or multiblock copolymer. An exemplary embodiment of a suitable diblock copolymer structure may include, but is not limited to, the structure generally represented by Formula VI, where m and n are integers and X represents a functionality bound to a monomer unit of the polymer backbone:

Formula VI

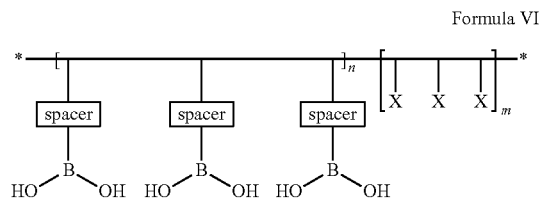

In various embodiments, the copolymers and block copolymers of Formulas III through VI can have an average molecular weight between about 1,000 Daltons and about 2,000,000 Daltons. For the multifunctional boronic acid crosslinking agents having the general structures shown in Formulas III through VI, the monomers within the polymer structure may be any suitable monomers that result in a water-soluble polymer molecule and do not interfere with the crosslinking of the boronic acid group with a gelling agent. In Formulas III and VI, the boronic acid functional group may be directly bonded to the backbone of the polymer and/or the boronic acid functional group may be connected to the polymer backbone with an intervening spacer group.

In some embodiments, a multifunctional boronic acid crosslinking agent of the general structure shown in Formula III, can be synthesized by polymerization of a vinyl monomer containing a boronic acid functional group (e.g., 3-acrylamidophenyl boronic acid) and any suitable water-soluble monomer containing a vinyl group including, but not limited to, acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, vinylbenzene sulfonic acid, methacrylic acid, vinyl caprolactam, N-vinylformamide, diallyl amine, N,N-diallylacetamide, dimethyldiallyl ammonium halide, itaconic acid, styrene sulfonic acid, methacrylamidoethyltrimethyl ammonium halide, quaternary salt derivatives of acrylamide, and quaternary salt derivatives of acrylic acid, alkyl acrylates, alkyl methacrylates, alkyl acrylamides, alkyl methacrylamides, alkyl dimethylammoniumethyl methacrylate halides, alkyl dimethylammoniumpropyl methacrylamide halides, any derivatives thereof, and any combinations thereof.

Other functional groups may also be present along the polymer backbone. In some embodiments, the boronic acid functional group may be grafted onto an already formed polymer backbone. In some embodiments, as generally represented by Formulas III and VI, the ratio of the boronic acid monomer units to the other monomer units in the polymer may range from a lower limit of about 1:1, 1:10, 1:20, 1:30, 1:40, 1:50, 1:60, 1:70, 1:80, 1:90, and 1:100 to an upper limit of about 1:200, 1:190, 1:180, 1:170, 1:160, 1:150, 1:140, 1:130, 1:120, 1:110, and 1:100, encompassing any value and subset therebetween.

In some embodiments, the multifunctional boronic acid crosslinking agents may comprise an equilibrium species. For example, the multifunctional boronic acid crosslinking agents may become protonated or deprotonated depending on pH. Likewise, intramolecular interactions between atoms in the multifunctional boronic acid crosslinking agents of the present disclosure and the geometry of boron (e.g., tetrahedral or trigonal planar) can depend on pH and/or solvent (e.g., an alcohol-based solvent such as methanol). Thus, the exact chemical composition and geometry of the multifunctional boronic acid crosslinking agents may depend on a particular equilibrium. The geometry may also depend on the neighboring group participation in changing the steoreochemistry. For example, a nitrogen atom present in a neighboring group may share its lone pair of electrons with a boron to result in a tetrahedral geometry, which may allow for the formation of a bond to hydroxyl groups at a relatively neutral pH.

In some embodiments, a multifunctional boronic acid crosslinking agent may be prepared by incorporation of one or more of the monomer units listed above in the polymer synthesis with a boronic acid monomer unit. Formula VII illustrates an embodiment of the present disclosure, where x and y are integers and R is a hydrogen or an alkyl, alkenyl, alkynyl, aryl, heteroaryl, or cycloalkyl group. For example, a multifunctional boronic acid crosslinking agent according to Formula VII may be prepared by copolymerizing 3-acrylamidophenylboronic acid with an acrylamide monomer unit (e.g., N,N-dimethylacrylamide) in the ratio of a lower limit of about 1:1, 1:10, 1:20, 1:30, 1:40, 1:50, 1:60, 1:70, 1:80, 1:90, and 1:100 to an upper limit of about 1:200, 1:190, 1:180, 1:170, 1:160, 1:150, 1:140, 1:130, 1:120, 1:110, and 1:100, encompassing any value and subset therebetween (i.e., a ratio of x:y ranging from about 1:1 to about 1:200) by free radical polymerization to provide the multifunctional boronic acid crosslinking agent.

Formula VII

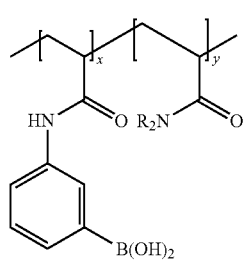

In another illustrative embodiment, the multifunctional boronic acid crosslinking agent may be prepared by copolymerizing 4-vinylphenylboronic acid and acrylamide. Such a copolymer has a structure represented by Formula VIII below.

Formula VIII

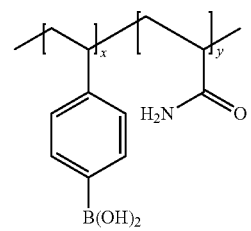

In some embodiments, the 4-vinylphenylboronic acid may be protected as a boronate ester such as, for example, a polyol boronate ester. Such a copolymer has a structure represented by Formula IX. It should be understood that any vicinal hydroxyl groups in the polyol can react with the boronic acid, and the indicated structure in Formula IX should be considered illustrative in that regard. That is, other isomers can be formed. In both Formulas VIII and IX, x and y are integers. As previously noted, the solubilizing groups (e.g., the polyol) may be removed at some point after the synthesis of the copolymer to liberate the free boronic acid groups for crosslinking.

Formula IX

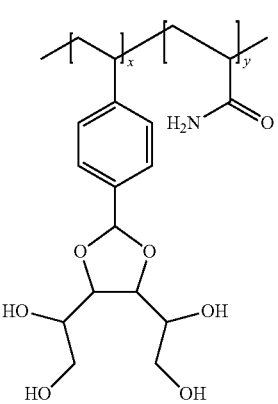

In yet another illustrative embodiment, the multifunctional boronic acid crosslinking agent can comprise a compound represented by Formula X, where x and y are integers and R is a hydrogen or an alkyl, alkenyl, alkynyl, aryl, heteroaryl, or cycloalkyl group. In this embodiment, the multifunctional boronic acid crosslinking agent may be prepared by copolymerizing 2-((2-acrylamidoethylamino)methyl)phenylboronic acid and an acrylamide in the ratio of a lower limit of about 1:1, 1:10, 1:20, 1:30, 1:40, 1:50, 1:60, 1:70, 1:80, 1:90, and 1:100 to an upper limit of about 1:200, 1:190, 1:180, 1:170, 1:160, 1:150, 1:140, 1:130, 1:120, 1:110, and 1:100, encompassing any value and subset therebetween (e.g., a ratio of x:y ranging from about 1:1 to about 1:200 in Formula X) by free radical polymerization.

Formula X

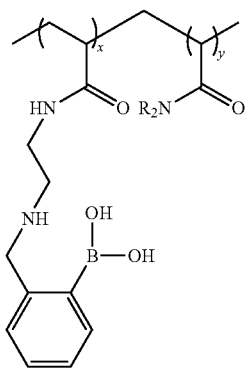

In still another illustrative embodiment, the multifunctional boronic acid crosslinking agent may be a difunctional boronic crosslinking agent. For example, when R is O or NH, the difunctional boronic acid crosslinking agent of Formula X may be prepared by reacting two equivalents of 2-formylphenylboronic acid with one equivalent of oligomeric ethylene oxide or oligomeric ethylenediamine followed by reduction of the intermediate imine. In an embodiment, the reduction of the intermediate imine may be conducted using reductive amination techniques.

In some embodiments, the crosslinking agent may be adhered to the DTHA to form the coated proppant particulates described herein in an amount to saturate the portion of the proppant particulates having the DTHA coated thereon. In other embodiments, the crosslinking agent may be more sparsely dispersed or otherwise at least partially coated onto the proppant particulate. In general, the crosslinking agent may be present in the range of a lower limit of about 0.01%, 0.05%, 1%, 1.25%, 1.5%, 1.75%, 2%, 2.25%, and 2.5% to an upper limit of about 5%, 4.75%, 4.5%, 4.25%, 4%, 3.75%, 3.5%, 3.25%, 3%, 2.75%, and 2.5% by weight of the coated proppant particulates, encompassing any value and subset therebetween.

Accordingly, as used herein, the term "coated proppant particulates" refers to a proppant particulate at least partially coated with a DTHA and a crosslinking agent. The coated proppant particulates, in some embodiments, may be used for forming a proppant pack in a fracture in a subterranean formation. As used herein, the term "proppant pack" refers to a collection of proppant particulates (including the coated proppant particulates described herein) in a fracture in a subterranean formation. In some embodiments, the present disclosure provides a method of including the coated proppant particulates in a treatment fluid, the treatment fluid further comprising an aqueous base fluid, a gelling agent, a curable resin, and a gel breaker. The coated proppant particulates may be pre-included in the treatment fluids described herein or, in some cases, may be added to the treatment fluids at the worksite (or well site) or on-the-fly, without departing from the scope of the present disclosure. As used herein, the term "on-the-fly," refers to performing an operation during a subterranean treatment that does not require stopping normal operations.

The treatment fluid is introduced into a subterranean formation having at least one fracture therein, wherein the gelling agent in the treatment fluid and the crosslinking agent of the coated proppant particulates react so as to crosslink the gelling agent and locally viscosify the treatment fluid surrounding each coated proppant particulate, thereby suspending the coated proppant particulates. Because the crosslinking agent is adhered to the coated proppant particulates, the crosslinking agent and the gelling agent work at the specific location of each coated proppant particulate to provide suspension in the treatment fluid. That is, the crosslinking agent does not detach from the coated proppant particulates during suspension. Accordingly, only a relatively small amount of gelling agent is needed to suspend the coated proppant particulates compared to traditional suspension treatment fluids which may crosslink and gel in areas in which proppant is not located.

The individually suspended coated proppant particulates are then placed within the at least one fracture in the subterranean formation to form a proppant pack therein. Thereafter, the breaker is activated or otherwise reacted or released to cause the crosslink(s) formed between the crosslinking agent on the coated proppant particulates and the gelling agent in the treatment fluid to break (e.g., chemically break, degrade, and the like), thereby causing the localized viscosity of the treatment fluid to revert to a thin fluid, which can be produced back to the surface at a desirable time. The broken treatment fluid exposes the DTHA on the coated particulates, allowing it to react with the curable resin in the treatment fluid. The DTHA acts as a hardening agent in the presence of the curable resin, thereby curing the resin to form a consolidated, permeable proppant pack. As used herein, the terms "consolidated proppant pack" and "consolidated, permeable proppant pack" refers to a proppant pack that is generally not susceptible to entrainment of individual proppant particulates with produced fluids. The consolidated proppant pack is composed of the coated proppant particulates described herein and the DTHA coated thereon continues to exhibit tacky qualities. Accordingly, any proppant flowback that is not controlled by the consolidation of the proppant pack in the fracture with the reaction between the curable resin and the DTHA, may be further controlled by adherence to the tackiness of the DTHA on the coated proppant particulates. Moreover, the tackiness of the DTHA may also control production of formation fines and other loose particulates from the subterranean formation.

In some embodiments, the coated proppant particulates may further be encapsulated in a partitioning agent. The partitioning agent may act to protect the coated proppant particulates during storage, or permit their storage in a dry form. The partitioning agent, in some embodiments, may be frangible, such that it is removed upon abrasion or shear. For example, when stored in a dry condition, the partitioning agent may be frangible and removed by agitating the stored coated proppant particulates. In other embodiments, the partitioning agent is a material that dissipates in the presence of an aqueous fluid. As such, the partitioning agent may be removed while suspended in the treatment fluids described herein. In some embodiments, the partitioning agent preferably dissipates quickly in the treatment fluid, particularly if the treatment fluid is to be used immediately or quickly after the components are combined. In other embodiments, the partitioning agent may be selected such that it dissipates over a particular period of time, such as if the treatment fluid is not expected to be used immediately after the components are combined. Suitable partitioning agents that dissipate in the presence of an aqueous base fluid may include, but are not limited to, a salt, barium sulfate, benzoic acid, polyvinyl alcohol, sodium carbonate, sodium bicarbonate, calcium oxide, a degradable polymer, poly(glycolide), poly(ε-caprolactone), poly(hydroxybutyrate), poly(anhydride), poly(orthoester), poly(amino acid), poly(ethylene oxide), poly(phosphazene), and any combination thereof.

As discussed, the treatment fluids described herein comprise the coated proppant particulates and an aqueous base fluid, a gelling agent, a curable resin, and a gel breaker.

The aqueous base fluids described in some embodiments herein may include, but are not limited to fresh water, saltwater (e.g., water containing one or more salts dissolved therein), seawater, and any combination thereof. Generally, the aqueous base fluid (i.e., the water) may be from any source, provided that it does not contain components that might adversely affect the stability and/or performance of the coated proppant particulates and/or treatment fluids comprising the coated proppant particulates described herein. When the aqueous base fluid selected is saltwater or seawater, the salt concentration is preferably less than about 15% by weight per volume ("w/v") of the aqueous base fluid, so as to not substantially impact the stability of the fluid. In some embodiments, the aqueous base fluid may additionally have trace amounts of an alcohol (e.g., methanol, ethanol, and the like) in an amount of about 1% by volume of the aqueous base fluid or less. Additionally, one or more buffer or pH agents may be included to adjust the pH of the treatment fluids described herein.

In some embodiments, the treatment fluids include a gelling agent that reacts with the crosslinking agent coated onto the coated proppant particulates to viscosify the treatment fluid near or around a coated proppant particulate (i.e., localized viscosification) to suspend and transport the coated proppant particulates. Suitable gelling agents may comprise any substance (e.g., a polymeric material) capable of increasing the viscosity of the treatment fluid surrounding the coated proppant particulates when reacted with the crosslinking agent. The gelling agents may be naturally occurring gelling agents, synthetic gelling agents, or a combination thereof. The gelling agents also may be cationic gelling agents, anionic gelling agents, or a combination thereof. Suitable gelling agents may include, but are not limited to, polysaccharides; biopolymers; and/or derivatives thereof that contain one or more of these monosaccharide units: galactose, mannose, glucoside, glucose, xylose, arabinose, fructose, glucuronic acid, or pyranosyl sulfate. Examples of suitable polysaccharides may include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose, and carboxymethylhydroxyethylcellulose), xanthan, scleroglucan, succinoglycan, diutan, and combinations thereof. In certain embodiments, the gelling agents comprise an organic carboxylated polymer, such as CMHPG.

Suitable synthetic polymer gelling agents may include, but are not limited to, 2,2'-azobis(2,4-dimethyl valeronitrile), 2,2'-azobis(2,4-dimethyl-4-methoxy valeronitrile), polymers and copolymers of acrylamide ethyltrimethyl ammonium chloride, acrylamide, acrylamido- and methacrylamido-alkyl trialkyl ammonium salts, acrylamidomethylpropane sulfonic acid, acrylamidopropyl trimethyl ammonium chloride, acrylic acid, dimethylaminoethyl methacrylamide, dimethylaminoethyl methacrylate, dimethylaminopropyl methacrylamide, dimethyldiallylammonium chloride, dimethylethyl acrylate, fumaramide, methacrylamide, methacrylamidopropyl trimethyl ammonium chloride, methacrylamidopropyldimethyl-n-dodecylammonium chloride, methacrylamidopropyldimethyl-n-octylammonium chloride, methacrylamidopropyltrimethylammonium chloride, methacryloylalkyl trialkyl ammonium salts, methacryloylethyl trimethyl ammonium chloride, methacrylylamidopropyldimethylcetylammonium chloride, N-(3-sulfopropyl)-N-methacrylamidopropyl-N,N-dimethyl ammonium betaine, N,N-dimethylacrylamide, N-methylacrylamide, nonylphenoxypoly(ethyleneoxy)ethylmethacrylate, partially hydrolyzed polyacrylamide, poly 2-amino-2-methyl propane sulfonic acid, polyvinyl alcohol, sodium 2-acrylamido-2-methylpropane sulfonate, quaternized dimethylaminoethylacrylate, quaternized dimethylaminoethylmethacrylate, any derivatives thereof, and any combinations thereof. In certain embodiments, the gelling agent comprises an acrylamide/2-(methacryloyloxy)ethyltrimethylammonium methyl sulfate copolymer. In certain embodiments, the gelling agent may comprise an acrylamide/2-(methacryloyloxy)ethyltrimethylammonium chloride copolymer. In certain embodiments, the gelling agent may comprise a derivatized cellulose that comprises cellulose grafted with an allyl or a vinyl monomer. Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used as gelling agents.

As previously discussed, the presence of the crosslinking agent coated onto the proppant particulates permits a reduced amount of gelling agent to be used in the treatment fluids because the reaction between the crosslinking agent and the gelling agent permits localized viscosification of the treatment fluid surrounding the coated proppant particulates. In some embodiments, the gelling agent may be present in treatment fluids described herein in an amount in the range of from a lower limit of about 0.1%, 0.5%, 1%, 1.5%, 2%, and 2.5% to an upper limit of about 5%, 4.5%, 4%, 3.5%, 3%, and 2.5% by weight of the treatment fluid, encompassing any value and subset therebetween.

The curable resin in the treatment fluids described herein is capable of being hardened or otherwise cured into a mass by the DTHA, such as to form a consolidated proppant pack. Suitable resins for use in the embodiments described herein include, but are not limited to, an epoxy resin, a novolak resin, a polyepoxide resin, a phenol-aldehyde resin, a urea-aldehyde resin, a urethane resin, a phenolic resin, a furan resin, a furan-furfuryl alcohol resin, a phenol-latex resin, a phenol-formaldehyde resin, a silicon-based resin, a polyester resin, a polyester hybrid resin, a polyester copolymer resin, a polyurethane resin, a polyurethane hybrid resin, a polyurethane copolymer resin, an acrylate resin, and any combination thereof. In some embodiments, the curable resin may be present in the treatment fluids described herein in an amount in the range of a lower limit of about 0.1%, 0.2%, 0.3%, 0.4%, 0.5%, 0.6%, 0.7%, 0.8%, 0.9%, 1%, 1.1%, 1.2%, 1.3%, 1.4%, 1.5%, 1.6%, 1.7%, 1.8%, 1.9%, and 2% to an upper limit of about 4%, 3.9%, 3.8%, 3.7%, 3.6%, 3.5%, 3.4%, 3.3%, 3.2%, 3.1%, 3%, 2.9%, 2.8%, 2.7%, 2.6%, 2.5%, 2.4%, 2.3%, 2.2%, 2.1%, and 2% by weight of the coated proppant particulates, encompassing any value and subset therebetween. In some embodiments, the curable resin may form an aqueous-based emulsion in the aqueous base fluids of the treatment fluids described herein.

Any solvent that is compatible with the curable resin and achieves the desired viscosity effect is suitable for use in the embodiments of the present disclosure. Preferred solvents include those listed above in connection with tackifying compounds. Suitable solvents may include, but are not limited to, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, fatty acid methyl esters, and butylglycidyl ether, and combinations thereof. Other preferred solvents may include aqueous dissolvable solvents such as, methanol, isopropanol, butanol, and glycol ether solvents, and combinations thereof. Suitable glycol ether solvents include, but are not limited to, diethylene glycol methyl ether, dipropylene glycol methyl ether, 2-butoxy ethanol, ethers of a C2 to C6 dihydric alkanol containing at least one C1 to C6 alkyl group, mono ethers of dihydric alkanols, methoxypropanol, butoxyethanol, and hexoxyethanol, and isomers thereof. Selection of an appropriate solvent is dependent on the curable resin composition chosen to achieve a suitable viscosity.

The treatment fluids described herein may further comprise a gel breaker capable of breaking by any mechanism the crosslink between the crosslinking agent on the coated proppant particulates and the gelling agent. Examples of suitable gel breakers may include, but are not limited to, an oxidative breaker, an acid breaker, a delayed release acid breaker, a delayed release enzyme breaker, a temperature activated breaker, a hydrolysable ester breaker, any encapsulated in an encapsulating material, and any combination thereof. Examples of oxidative breakers suitable include, but are not limited to, organic peroxides, alkali metal persulfates, and alkali metal chlorites, bromates, chlorates, hypochlorites, permanganates, and any combination thereof. Examples of acid breakers include, but are not limited to, hydrochloric acid, hydrofluoric acid, hydrobromic acid, hydroiodic acid, sulfuric acid, nitric acid, boric acid, chromic acid, and any combination thereof. Examples of delayed release acid breakers include, but are not limited to, acetic anhydride and organic and inorganic acids such as fumaric acid, benzoic acid, sulfonic acid, phosphoric acids, aliphatic polyesters, poly lactic acid, poly(lactides), polyanhydrides, poly(amino acids), and any combination thereof. Delayed release enzyme breakers may be used to catalyze the hydrolysis of glycosidic bonds between the monomer units of polysaccharides in the gel, thus reducing the gel viscosity.

Examples of suitable delayed release enzyme breakers include, but are not limited to, alpha and beta amylases, exo- and endo-glucosidases, amyloglucosidase, oligoglucosidase, invertase, maltase, cellulase, hemicellulase, endo-xylanase, exo-xylanase, and any combination thereof. In some embodiments, the enzyme breakers are enzymes or combinations of enzymes that attack the glucosidic linkages of a cellulose gelling agent backbone and degrade the gelling agent into mostly monosaccharide and disaccharide units. Examples of such enzyme breakers include, but are not limited to, cellulase, hemicellulase, endo-glucosidase, exo-glucosidase, exo-xylanase, and any combination thereof. The two most preferred enzyme breakers are exo- and endo-glucosidases. Temperature activated breakers activate by being heated by the subterranean zone in which they are placed, or by another external heat source. Examples of suitable temperature activated breakers include, but are not limited to, alkaline earth metal peroxides, such as calcium peroxide and magnesium peroxide, zinc peroxide and mixtures thereof. Examples of suitable hydrolysable esters include, but are not limited to, sorbitol, catechol, dimethyl glutarate and mixtures of dimethyl glutarate, dimethyl succinate, dimethyl adipate, and any combination thereof.

In some embodiments, the gel breaker may be encapsulated in an encapsulating material that dissipates in an aqueous fluid. Suitable encapsulating materials include any material that may be used as the partitioning agent, as described in the present disclosure.

The gel breaker may be present in the treatment fluids described herein in an amount in the range of a lower limit of about 0.001%, 0.025%, 0.05%, 0.075%, 0.1%, 0.125%, 0.15%, 0.175%, 0.2%, 0.225%, 0.25%, 0.275%, 0.3%, 0.325%, 0.35%, 0.375%, 0.4%, 0.425%, 0.45%, 0.475%, and 0.5% to an upper limit of about 1%, 0.975%, 0.95%, 0.925%, 0.9%, 0.875%, 0.85%, 0.825%, 0.8%, 0.775%, 0.75%, 0.725%, 0.7%, 0.675%, 0.65%, 0.625%, 0.6%, 0.575%, 0.55%, 0.525%, and 0.5% by weight of the gelling agent, encompassing any value and subset therebetween.

Suitable proppant particulates may comprise any material suitable for use in a subterranean operation and may include, but are not limited to, sand; bauxite; ceramic materials; glass materials; polymer materials; polytetrafluoroethylene materials; nut shell pieces; cured resinous particulates comprising nut shell pieces; seed shell pieces; cured resinous particulates comprising seed shell pieces; fruit pit pieces; cured resinous particulates comprising fruit pit pieces; wood; composite particulates; and any combination thereof. Suitable composite particulates may comprise a binder and a filler material wherein suitable filler materials may include, but are not limited to, silica; alumina; fumed carbon; carbon black; graphite; mica; titanium dioxide; meta-silicate; calcium silicate; kaolin; talc; zirconia; boron; fly ash; hollow glass microspheres; solid glass; and any combination thereof. The mean size of the proppant particulates generally may range from about 2 mesh to about 400 mesh on the U.S. Sieve Series, or even higher; however, in certain circumstances, other mean sizes may be desired and will be entirely suitable for practice of the present invention. In particular embodiments, the preferred mean size distribution of the proppant particulates ranges are one or more of 6/12, 8/16, 12/20, 16/30, 20/40, 30/50, 40/60, 40/70, or 50/70 mesh. It should be understood that the term "proppant particulate" or "particulate," as used in this disclosure, includes all known shapes of materials, including substantially spherical materials; fibrous materials; polygonal materials (e.g., cubic materials); and any combination thereof. Moreover, fibrous materials may be included in certain embodiments of the present invention. In certain embodiments, the proppant particulates, once coated as described herein, may be present in the treatment fluids in an amount in the range of from a lower limit of about 0.5 pounds per gallon ("ppg"), 1 ppg, 5 ppg, 10 ppg, and 15 ppg to an upper limit of about 30 ppg, 25 ppg, 20 ppg, and 15 ppg by volume of the treatment first, encompassing any value and subset therebetween.

In some embodiments, the treatment fluids described herein may further comprise an additive selected from the group consisting of a salt, a weighting agent, an inert solid, a fluid loss control agent, an emulsifier, a dispersion aid, a corrosion inhibitor, an emulsion thinner, an emulsion thickener, a viscosifying agent, a gelling agent, a surfactant, a particulate, a proppant, a gravel particulate, a lost circulation material, a foaming agent, a gas, a pH control additive, a breaker, a biocide, a crosslinker, a stabilizer, a chelating agent, a scale inhibitor, a gas hydrate inhibitor, an oxidizer, a reducer, a friction reducer, a clay stabilizing agent, and any combination thereof.

In various embodiments, systems configured for delivering the treatment fluids described herein to a downhole location are described. In various embodiments, the systems can comprise a pump fluidly coupled to a tubular, the tubular containing the coated proppant particulates in the treatment fluid, and any additional additives, disclosed herein.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver the treatment fluids of the embodiments disclosed herein to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the embodiments disclosed herein may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

Embodiment A: A method comprising: providing a treatment fluid comprising an aqueous base fluid, a gelling agent, a curable resin, a gel breaker, and coated proppant particulates, wherein the coated proppant particulates comprise proppant particulates at least partially coated with a dual tackifying-hardening agent selected from the group consisting of a dimer acid/trimer acid blend, and with a crosslinking agent at least partially coated thereon, and wherein the dual tackifying-hardening agent both exhibits tackifying qualities and is capable of hardening a curable resin; introducing the treatment fluid into a subterranean formation having a fracture therein, wherein the crosslinking agent and the gelling agent crosslink into a gel to suspend the coated proppant particulates in the treatment fluid; placing the coated proppant particulates into the fracture to form a proppant pack; breaking the crosslink between the crosslinking agent and the gelling agent with the gel breaker, thereby exposing the dual tackifying-hardening agent; reacting the dual tackifying-hardening agent with the curable resin to harden the curable resin, thereby forming a consolidated proppant pack with tackifying qualities due to the presence of the dual tackifying-hardening agent.

Embodiment A may have one or more of the following additional elements in any combination:

Element A1: Wherein the crosslinking agent is adhered to the dual tackifying-hardening agent due to the tackifying qualities of the dual tackifying-hardening agent.

Element A2: Wherein the crosslinking agent is in at least one of a dry form and a liquid form.

Element A3: Wherein the gelling agent is selected from the group consisting of a natural gelling agent, a synthetic gelling agent, and any combination thereof.

Element A4: Wherein the crosslinking agent is selected from the group consisting of a metal ion, a compound capable of producing a metal ion, a multifunctional boronic acid compound, and any combination thereof.

Element A5: Wherein the curable resin is selected from the group consisting of an epoxy resin, a novolak resin, a polyepoxide resin, a phenol-aldehyde resin, a urea-aldehyde resin, a urethane resin, a phenolic resin, a furan resin, a furan-furfuryl alcohol resin, a phenol-latex resin, a phenol-formaldehyde resin, a silicon-based resin, a polyester resin, a polyester hybrid resin, a polyester copolymer resin, a polyurethane resin, a polyurethane hybrid resin, a polyurethane copolymer resin, an acrylate resin, and any combination thereof.

Element A6: Wherein the gel breaker is selected from the group consisting of an oxidative breaker, an acid breaker, a delayed release acid breaker, a delayed release enzyme breaker, a temperature activated breaker, a hydrolysable ester breaker, any encapsulated in an encapsulating material, and any combination thereof.

Element A7: Wherein the curable resin is present in the treatment fluid in an amount in the range of between about 0.1% to about 4% by weight of the coated proppant particulates.

Element A8: Further comprising a wellhead with a tubular extending therefrom and into a subterranean formation and a pump fluidly coupled to the tubular, wherein the step of: introducing the treatment fluid into a subterranean formation having a fracture therein comprising introducing the treatment fluid through the tubular.

By way of non-limiting example, exemplary combinations applicable to A include: A with A1 and A3; A with A2, A4, and A8; A with A7 and A8; A with A3, A5, and A6.

Embodiment B: A method comprising: providing a treatment fluid comprising an aqueous base fluid, a gelling agent, a curable resin, a gel breaker, and coated proppant particulates, wherein the coated proppant particulates comprise proppant particulates at least partially coated with a dual tackifying-hardening agent selected from the group consisting of a dimer acid/trimer acid blend, and with a crosslinking agent at least partially coated thereon, wherein the dual tackifying-hardening agent both exhibits tackifying qualities and is capable of hardening a curable resin, and wherein the coated proppant particulates are at least partially encapsulated with a partitioning agent; introducing the treatment fluid into a subterranean formation having a fracture therein; removing at least a portion of the partitioning agent, thereby allowing the crosslinking agent and the gelling agent to crosslink into a gel to suspend the coated proppant particulates in the treatment fluid; placing the coated proppant particulates into the fracture to form a proppant pack; breaking the crosslink between the crosslinking agent and the gelling agent with the gel breaker, thereby exposing the dual tackifying-hardening agent; reacting the dual tackifying-hardening agent with the curable resin to harden the curable resin, thereby forming a consolidated proppant pack with tackifying qualities due to the presence of the dual tackifying-hardening agent.

Embodiment B may have one or more of the following additional elements in any combination:

Element B1: Wherein the crosslinking agent is adhered to the dual tackifying-hardening agent due to the tackifying qualities of the dual tackifying-hardening agent.

Element B2: Wherein the crosslinking agent is in at least one of a dry form and a liquid form.

Element B3: Wherein the gelling agent is selected from the group consisting of a natural gelling agent, a synthetic gelling agent, and any combination thereof.

Element B4: Wherein the crosslinking agent is selected from the group consisting of a metal ion, a compound capable of producing a metal ion, a multifunctional boronic acid compound, and any combination thereof.

Element B5: Wherein the curable resin is selected from the group consisting of an epoxy resin, a novolak resin, a polyepoxide resin, a phenol-aldehyde resin, a urea-aldehyde resin, a urethane resin, a phenolic resin, a furan resin, a furan-furfuryl alcohol resin, a phenol-latex resin, a phenol-formaldehyde resin, a silicon-based resin, a polyester resin, a polyester hybrid resin, a polyester copolymer resin, a polyurethane resin, a polyurethane hybrid resin, a polyurethane copolymer resin, an acrylate resin, and any combination thereof.

Element B6: Wherein the gel breaker is selected from the group consisting of an oxidative breaker, an acid breaker, a delayed release acid breaker, a delayed release enzyme breaker, a temperature activated breaker, a hydrolysable ester breaker, any encapsulated in an encapsulating material, and any combination thereof.

Element B7: Wherein the curable resin is present in the treatment fluid in an amount in the range of between about 0.1% to about 4% by weight of the coated proppant particulates.

Element B8: Further comprising a wellhead with a tubular extending therefrom and into a subterranean formation and a pump fluidly coupled to the tubular, wherein the step of: introducing the treatment fluid into a subterranean formation having a fracture therein comprising introducing the treatment fluid through the tubular.

Element B9: Wherein the partitioning agent comprises a material that dissipates in the presence of an aqueous base fluid.

Element B10: Wherein the partitioning agent comprises a material that dissipates in the presence of an aqueous base fluid selected from the group consisting of a salt, barium sulfate, benzoic acid, polyvinyl alcohol, sodium carbonate, sodium bicarbonate, calcium oxide, a degradable polymer, poly(glycolide), poly($\varepsilon$-caprolactone), poly(hydroxybutylrate), poly(anhydride), poly(orthoester), poly(amino acid), poly(ethylene oxide), poly(phosphazene), and any combination thereof.

By way of non-limiting example, exemplary combinations applicable to B include: B with B2, B3, and B10; B with B4 and B8; B with B1 and B5; B with B6, B7, and B9.

Embodiment C: A coated proppant particulate comprising: proppant particulates at least partially coated with a dual tackifying-hardening agent selected from the group consisting of a dimer acid/trimer acid blend, and with a crosslinking agent at least partially coated thereon, wherein the dual tackifying-hardening agent both exhibits tackifying qualities and is capable of hardening a curable resin.

Embodiment C may have one or more of the following additional elements in any combination:

Element C1: Wherein the crosslinking agent is in at least one of a dry form and a liquid form.

Element C2: Wherein the crosslinking agent is selected from the group consisting of a metal ion, a compound capable of producing a metal ion, a multifunctional boronic acid compound, and any combination thereof.

Element C3: Wherein the coated proppant particulates are at least partially encapsulated with a partitioning agent.

Element C4: Wherein the coated proppant particulates are at least partially encapsulated with a partitioning agent, the partitioning agent being a material that dissipates in the presence of an aqueous base fluid.

Element C5: Wherein the coated proppant particulates are at least partially encapsulated with a partitioning agent, the partitioning agent being a material that dissipates in the presence of an aqueous base fluid selected from the group consisting of a salt, barium sulfate, benzoic acid, polyvinyl alcohol, sodium carbonate, sodium bicarbonate, calcium oxide, a degradable polymer, poly(glycolide), poly($\varepsilon$-caprolactone), poly(hydroxybutylrate), poly(anhydride), poly(orthoester), poly(amino acid), poly(ethylene oxide), poly(phosphazene), and any combination thereof.

By way of non-limiting example, exemplary combinations applicable to C include: C with C1 and C2; C with C2, C4, and C5; C with C3; C with C4.

To facilitate a better understanding of the embodiments described herein, the following examples of preferred or representative embodiments are given. In no way should the following examples be read to limit, or to define, the scope of the invention.

EXAMPLE 1

In this example, the tackifying and consolidation qualities of the DTHA described herein were evaluated. Coated proppant particulates were prepared by mixing 47 grams of 20/40 Brady sand and 1.5% v/w of a dimer acid/trimer acid blend DTHA with respect to the sand in a 250 mL jar. Once the DTHA was coated onto the particulates, 3.5 mL of a borate crosslinking agent was added to the jar and mixed with the DTHA coated sand to adhere thereto and form a thin coating on each sand grain, thereby forming the coated proppant particulates according to some embodiments described herein.

A treatment fluid was prepared using 100 mL of a hydrated hydroxypropyl guar gelling agent at 25 pounds per 1,000 gallons ("lb/Mgal"), and the pH was adjusted to 9.2 with MO-67, followed by the addition of 2 mL of a temperature breaker, VICON NF™, available from Halliburton Energy Services, Inc. In Houston, Tex. The treatment fluid was stirred and 0.77 mL of epoxy curable resin was added, followed by additional stirring.

To the coated proppant particulates, 100 mL of the treatment fluid was added and the mixture was stirred using a spatula until crosslinking characteristics were visually observed as a result of a thickening of the mixture characterized by "lipping." As used herein, the term "lipping" refers to the characteristic of a substance to appear similar to a tongue at the mouth of a jar when the jar containing the fluid is tilted 90° horizontally, but the substance maintains sufficient elasticity to resist spilling out of the jar for at least about 30 seconds or more. Thereafter, the treatment fluid comprising the coated proppant particulates was heated to about 82° C. (180° F.) in a water bath for 4 hours to activate the gel breaker and break the crosslinks formed between the crosslinking agent and the gelling agent. The broken fluid was then decanted. The remaining coated proppant particulates were packed into a 60 mL syringe and placed in an oven at about 107° C. (225° F.). A consolidated proppant pack was observed and tap water was flushed through the pack and no flowback was observed under faucet pressure, indicating a tensile strength of at least 50 psi because the facet water pressure was 60 psi. After removal from the syringe, the consolidated proppant pack remained sticky to the touch. Accordingly, the DTHA on the coated proppant particulates demonstrates both tacky qualities and the ability to cure or harden a curable resin, as described herein.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
providing a treatment fluid comprising an aqueous base fluid, a gelling agent, a curable resin, a gel breaker, and coated proppant particulates,
wherein the coated proppant particulates comprise proppant particulates at least partially coated with a dual tackifying-hardening agent selected from the group consisting of a dimer acid/trimer acid blend, and with a crosslinking agent at least partially coated thereon, and
wherein the dual tackifying-hardening agent both exhibits tackifying qualities and is capable of hardening a curable resin, and wherein the dual tackifying-hardening agent comprises at least one of: a trimer acid of at least 2% by weight of the dual tackifying-hardening agent, or a dimer acid of at least 78% by weight of the dual tackifying-hardening agent;
introducing the treatment fluid into a subterranean formation having a fracture therein,
wherein the crosslinking agent and the gelling agent crosslink into a gel to suspend the coated proppant particulates in the treatment fluid;
placing the coated proppant particulates into the fracture to form a proppant pack;
breaking the crosslink between the crosslinking agent and the gelling agent with the gel breaker, thereby exposing the dual tackifying-hardening agent; and
reacting the dual tackifying-hardening agent with the curable resin to harden the curable resin, thereby forming a consolidated proppant pack with tackifying qualities due to the presence of the dual tackifying-hardening agent.

2. The method of claim 1, wherein the crosslinking agent is adhered to the dual tackifying-hardening agent due to the tackifying qualities of the dual tackifying-hardening agent.

3. The method of claim 1, wherein the crosslinking agent is in at least one of a dry form and a liquid form.

4. The method of claim 1, wherein the gelling agent is selected from the group consisting of a natural gelling agent, a synthetic gelling agent, and any combination thereof.

5. The method of claim 1, wherein the crosslinking agent is selected from the group consisting of a metal ion, a compound capable of producing a metal ion, a multifunctional boronic acid compound, and any combination thereof.

6. The method of claim 1, wherein the curable resin is selected from the group consisting of an epoxy resin, a novolak resin, a polyepoxide resin, a phenol-aldehyde resin, a urea-aldehyde resin, a urethane resin, a phenolic resin, a furan resin, a furan-furfuryl alcohol resin, a phenol-latex resin, a phenol-formaldehyde resin, a silicon-based resin, a polyester resin, a polyester hybrid resin, a polyester copolymer resin, a polyurethane resin, a polyurethane hybrid resin, a polyurethane copolymer resin, an acrylate resin, and any combination thereof.

7. The method of claim 1, wherein the gel breaker is selected from the group consisting of an oxidative breaker, an acid breaker, a delayed release acid breaker, a delayed release enzyme breaker, a temperature activated breaker, a hydrolysable ester breaker, any encapsulated in an encapsulating material, and any combination thereof.

8. The method of claim 1, wherein the curable resin is present in the treatment fluid in an amount in the range of between about 0.1% to about 4% by weight of the coated proppant particulates.

9. The method of claim 1, further comprising a wellhead with a tubular extending therefrom and into a subterranean formation and a pump fluidly coupled to the tubular, wherein the step of: introducing the treatment fluid into a subterranean formation having a fracture therein comprising introducing the treatment fluid through the tubular.

10. A method comprising:
providing a treatment fluid comprising an aqueous base fluid, a gelling agent, a curable resin, a gel breaker, and coated proppant particulates,
  wherein the coated proppant particulates comprise proppant particulates at least partially coated with a dual tackifying-hardening agent selected from the group consisting of a dimer acid/trimer acid blend, and with a crosslinking agent at least partially coated thereon,
  wherein the dual tackifying-hardening agent both exhibits tackifying qualities and is capable of hardening a curable resin, wherein the dual tackifying-hardening agent comprises at least one of: a trimer acid of at least 2% by weight of the dual tackifying-hardening agent, or a dimer acid of at least 78% by weight of the dual tackifying-hardening agent, and
  wherein the coated proppant particulates are at least partially encapsulated with a partitioning agent;
introducing the treatment fluid into a subterranean formation having a fracture therein;
removing at least a portion of the partitioning agent, thereby allowing the crosslinking agent and the gelling agent to crosslink into a gel to suspend the coated proppant particulates in the treatment fluid;
placing the coated proppant particulates into the fracture to form a proppant pack;
breaking the crosslink between the crosslinking agent and the gelling agent with the gel breaker, thereby exposing the dual tackifying-hardening agent;
reacting the dual tackifying-hardening agent with the curable resin to harden the curable resin, thereby forming a consolidated proppant pack with tackifying qualities due to the presence of the dual tackifying-hardening agent.

11. The method of claim 10, wherein the crosslinking agent is adhered to the dual tackifying-hardening agent due to the tackifying qualities of the dual tackifying-hardening agent.

12. The method of claim 10, wherein the partitioning agent comprises a material that dissipates in the presence of an aqueous base fluid.

13. The method of claim 10, wherein the partitioning agent is selected from the group consisting of a salt, barium sulfate, benzoic acid, polyvinyl alcohol, sodium carbonate, sodium bicarbonate, calcium oxide, a degradable polymer, poly(glycolide), polyepsilon-caprolactone), poly(hydroxybutylrate), poly(anhydride), poly(orthoester), poly(amino acid), polyethylene oxide), poly(phosphazene), and any combination thereof.

14. The method of claim 10, wherein the gelling agent is selected from the group consisting of a natural gelling agent, a synthetic gelling agent, and any combination thereof.

15. The method of claim 10, wherein the crosslinking agent is selected from the group consisting of a metal ion, a compound capable of producing a metal ion, a multifunctional boronic acid compound, and any combination thereof.

16. The method of claim 10, wherein the curable resin is selected from the group consisting of an epoxy resin, a novolak resin, a polyepoxide resin, a phenol-aldehyde resin, a urea-aldehyde resin, a urethane resin, a phenolic resin, a furan resin, a furan-furfuryl alcohol resin, a phenol-latex resin, a phenol-formaldehyde resin, a silicon-based resin, a polyester resin, a polyester hybrid resin, a polyester copolymer resin, a polyurethane resin, a polyurethane hybrid resin, a polyurethane copolymer resin, an acrylate resin, and any combination thereof.

17. The method of claim 10, wherein the gel breaker is selected from the group consisting of an oxidative breaker, an acid breaker, a delayed release acid breaker, a delayed release enzyme breaker, a temperature activated breaker, a hydrolysable ester breaker, any encapsulated in an encapsulating material, and any combination thereof.

18. The method of claim 10, wherein the curable resin is present in the treatment fluid in an amount in the range of between about 0.1% to about 4% by weight of the coated proppant particulates.

19. The method of claim 10, further comprising a wellhead with a tubular extending therefrom and into a subterranean formation and a pump fluidly coupled to the tubular, wherein the step of: introducing the treatment fluid into a subterranean formation having a fracture therein comprising introducing the treatment fluid through the tubular.

20. A coated proppant particulate comprising:
proppant particulates at least partially coated with a dual tackifying-hardening agent selected from the group consisting of a dimer acid/trimer acid blend, with a crosslinking agent at least partially coated thereon,
wherein the dual tackifying-hardening agent both exhibits tackifying qualities and is capable of hardening a curable resin, and wherein the dual tackifying-hardening agent comprises at least one of: a trimer acid of at least 2% by weight of the dual tackifying-hardening agent, or a dimer acid of at least 78% by weight of the dual tackifying-hardening agent.

* * * * *